United States Patent [19]

Schasser

[11] 3,997,763
[45] Dec. 14, 1976

[54] TICKET READER AND IMPRINTER WITH BYPASS SWITCH

[75] Inventor: Donald S. Schasser, Pinckney, Mich.

[73] Assignee: Automatic Parking Devices, Inc., Farmington, Mich.

[22] Filed: Apr. 24, 1975

[21] Appl. No.: 571,267

[52] U.S. Cl. .................... 235/61.9 R; 194/DIG. 23
[51] Int. Cl.² ......................................... G06K 7/14
[58] Field of Search .................. 340/149 R, 149 A; 235/61.11 E, 61.9 R; 194/DIG. 23

[56] References Cited
UNITED STATES PATENTS

| | | | |
|---|---|---|---|
| 3,212,615 | 10/1965 | Hellar | 194/4 |
| 3,229,074 | 1/1966 | Harrington | 235/61.11 |
| 3,356,021 | 12/1967 | May et al. | 101/93 |
| 3,604,898 | 9/1971 | Magnusson | 235/61.6 |

*Primary Examiner*—Stuart N. Hecker
*Attorney, Agent, or Firm*—Barnes, Kisselle, Raisch & Choate

[57] ABSTRACT

A ticket reader and imprinter particularly suitable for use with previously dispensed parking tickets upon which information such as parking time and date is to be stamped. A limit switch is activated when a parking ticket is inserted by a vehicle operator into a throat of the imprinter, and an optical reader senses correct orientation and positioning of the ticket. The stamping solenoid of a conventional time recorder is then energized so that the desired time and date information is stamped upon the ticket, after which the ticket may be extracted from the imprinter by the vehicle operator. A swing-arm vehicle gate is activated when the ticket is stamped so that the vehicle operator may proceed into a parking zone.

A method of parking a vehicle in a multiple-zone parking facility is also disclosed wherein entrance to and exit from all but one of the parking zones is had through another parking zone rather than from a vehicle highway. At the entrance to and exit from each zone, suitable time and date indicia related to that zone is stamped upon a previously dispensed parking ticket.

3 Claims, 6 Drawing Figures

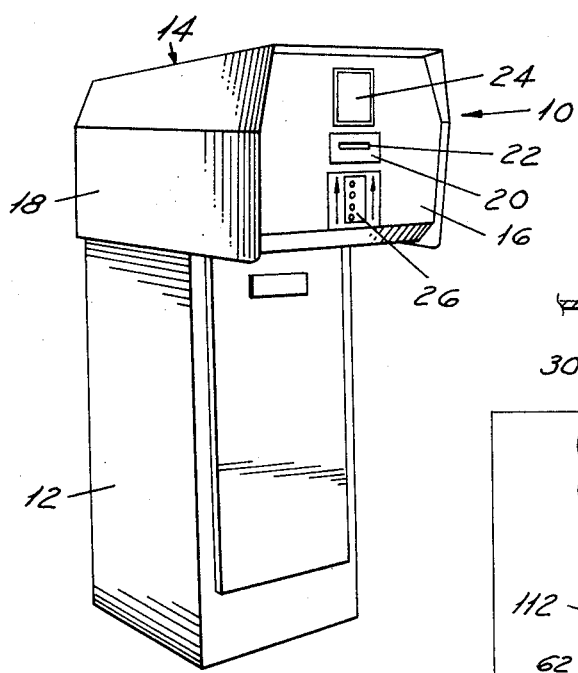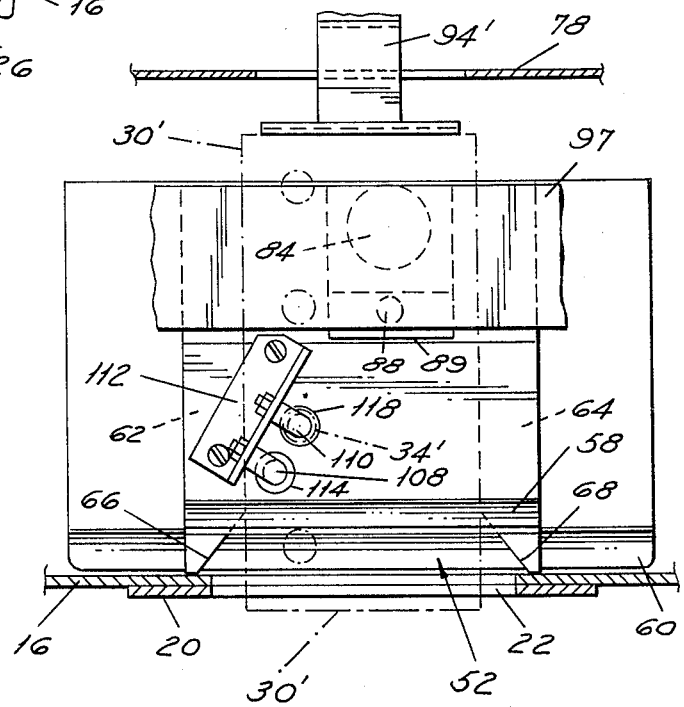

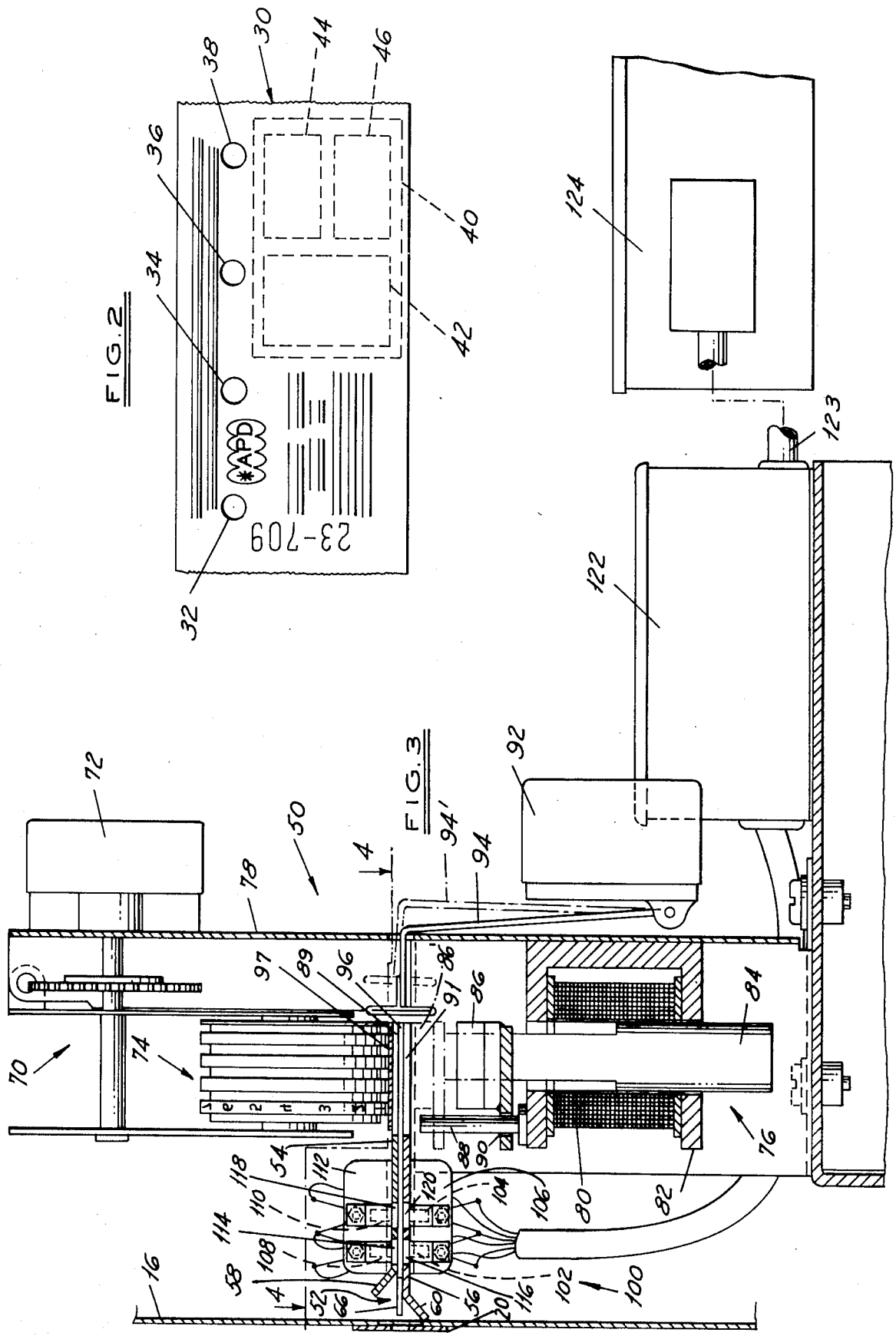

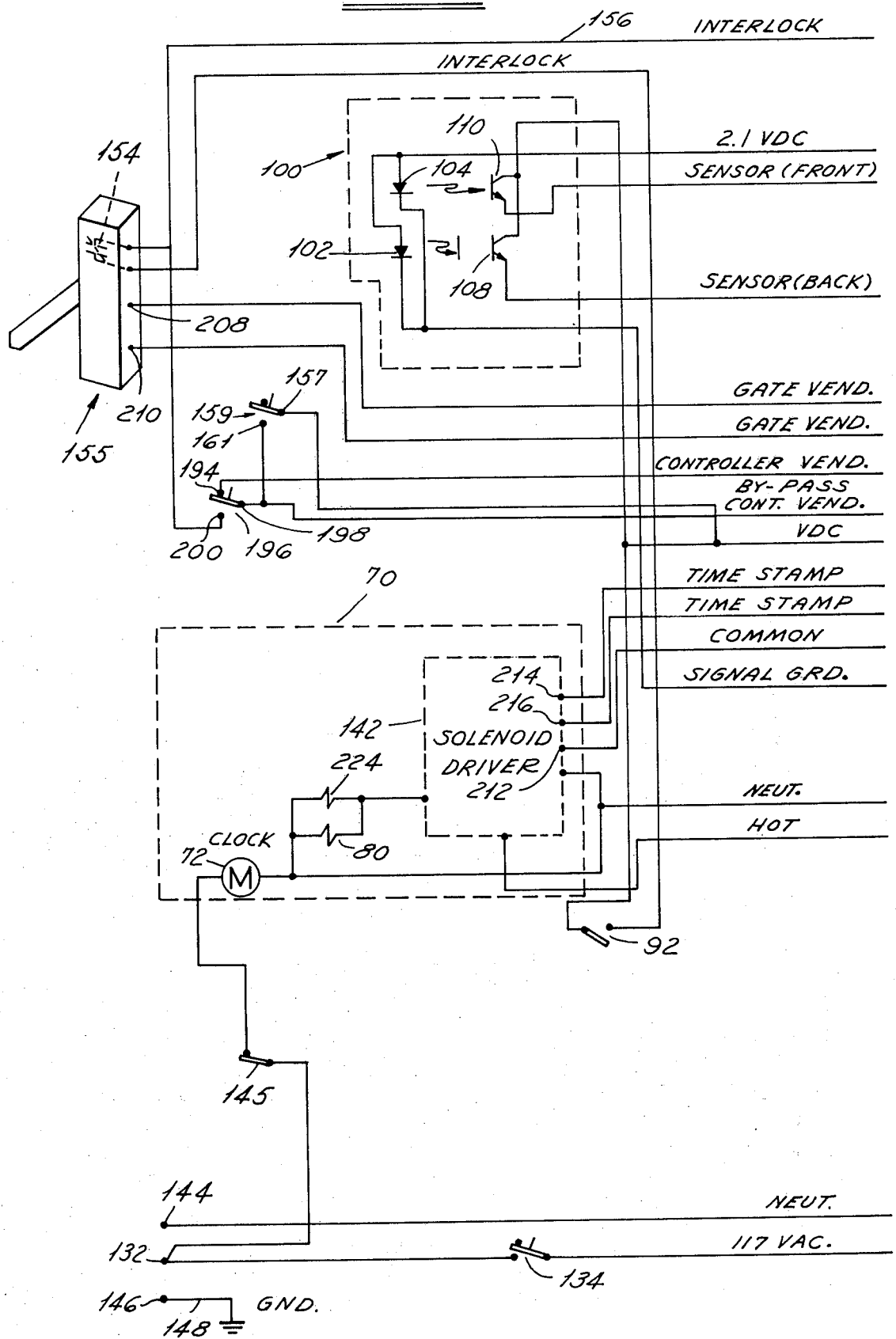

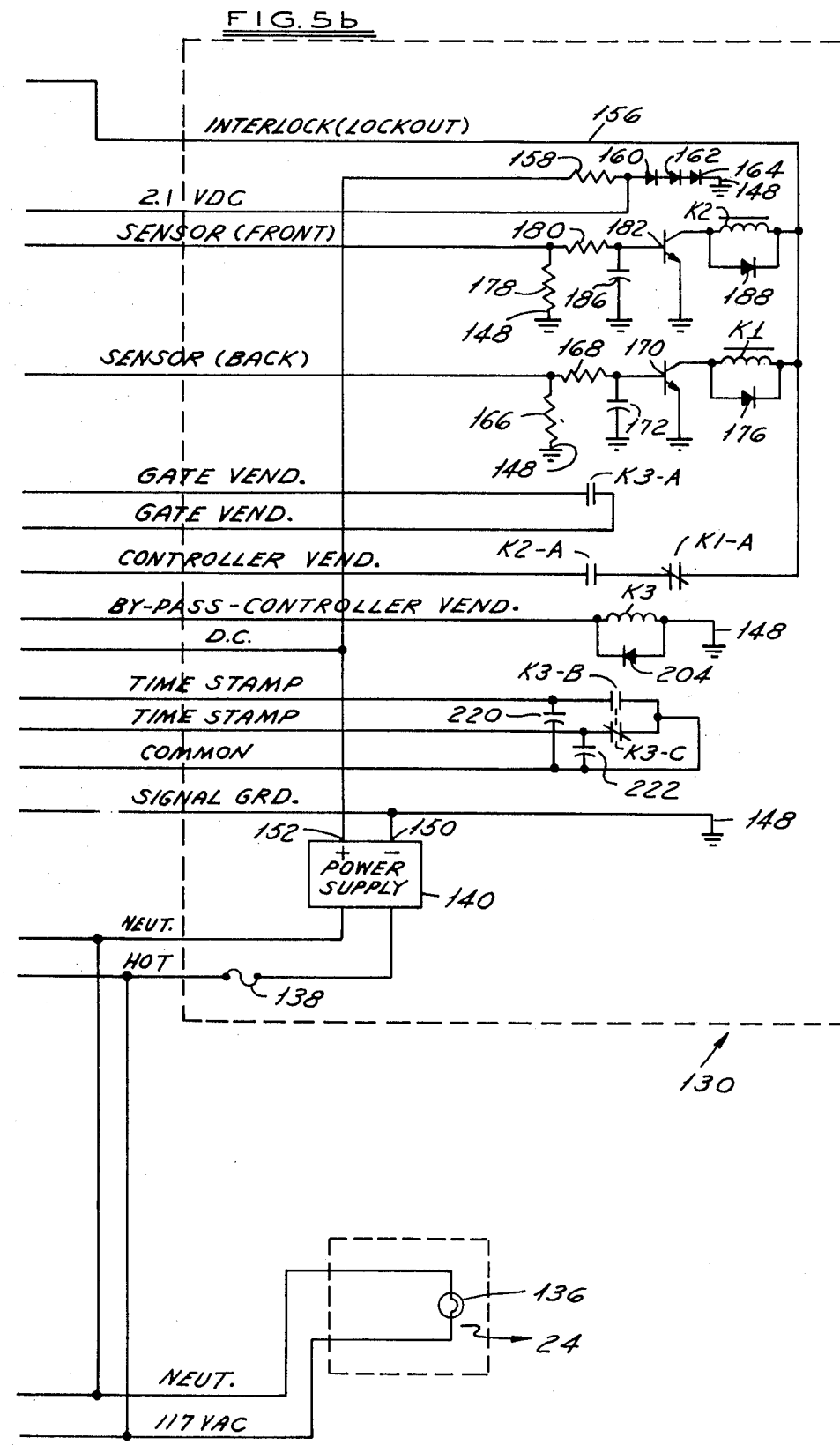

TICKET READER AND IMPRINTER WITH BYPASS SWITCH

The present invention relates to vehicle parking methods and parking lot vending mechanisms. More particularly, the invention relates to a device for imprinting information upon a previously-dispensed parking ticket, and to a method for parking automotive-type vehicles using such a device.

Devices for stamping information, such as time and date, upon parking tickets and then dispensing the same to vehicle operators are generally known in the art. Such a device, which may be located at a parking lot entrance and which wll automatically dispense time-stamped parking tickets to a vehicle operator, is shown in the U.S. patent of Nutter et al No. 2,795,875. In a ticket dispenser of this type a roll of preprinted tickets is mounted inside of a housing. Upon activation of the dispenser, as by a vehicle passing over a pressure sensitive mat or cable, a ticket is fed from the roll through a guideway or throat by a sprocketed wheel which engages prepunched holes in each ticket. Each ticket is stamped with time and date information, and is cut from the roll before dispensation. When the ticket is extracted from the dispenser throat by the vehicle operator, the dispenser signals in associated swing-arm vehicle gate to raise the gate arm and allow the vehicle to pass into the parking lot. The swing-arm gate may be, for example, a model G-89 Auto-Gate marketed by the assignee hereof. Before egress from the lot, the vehicle operator usually presents his parking ticket to a lot attendant who calculates a parking fee based, at least in part, upon the entrance time and date information stamped on the ticket.

In many conventional parking facilities, such as airport parking lots, the parking area is divided into several zones at each of which a different parking rate is levied. For example, the rate charged in a parking zone close to the airport terminal may be considerably higher than the rate charged in a more remote zone. Similarly, such parking faciliites are often divided into long and short term parking zones, with the per-hour rate in the short term zone being considerably higher than that for the long term zone. It has heretofore been the general practice at such parking facilities to provide a separate entrance and exit for each parking zone along with separate ticket dispensers at each entrance and separate attendants at each exit. Such a practice is economically wasteful and also leads to highway congestion due to the multiplied zone entrances and exits.

It is an object of the present invention to eliminate the requirement for separate entrances and exits for each of the several zones, and to eliminate the associated requirement for multiple ticket dispensers and lot attendants.

It is a further object of the present invention to provide a method for parking automotive-type vehicles in one of any number of parking zones wherein entrances and exit from all but one zone may be had through another zone rather than directly from a highway or street.

It is a related object of the present invention to provide an economical and reliable apparatus which will imprint special information on a previously dispensed parking ticket when a vehicle operator seeks entrance into one parking zone from another.

In accordance with the vehicle parking method contemplated for use with the present invention a vehicle enters into a first parking zone of a multiple-zone parking facility, at the entrance to which the vehicle operator receives a parking ticket from a standard ticket dispenser such as that described in the above-referenced Nutter et al patent. The operator then proceeds in his vehicle through the first zone to the entrance to a second parking zone having a different, and usually a lower, parking rate. At this entrance the previously dispensed ticket is stamped with appropriate time and date information or indicia related to the second zone, and is then returned to the operator. When the operator is ready to remove his vehicle from the parking facility, he must first exit the second zone into the first zone, at which exit his ticket is again stamped with time and date information, and returned to him. He may then proceed through the first parking zone to the main facility exit at which an attendant will accept the parking ticket and compute the fee in accordance with the time spent in the first and second zones. When the indicated time within the first zone is relatively short indicating only transit therethrough to reach the second zone, the fee may be computed on the basis of the time spent within the second zone only.

Further, in accordance with the present invention apparatus is provided for automatically receiving a previouslydispensed ticket and stamping coded time and date information thereon, which ticket is then returned to the vehicle operator. This apparatus may be conveniently located at the entrance to a second parking zone from a first parking zone and/or the exit from the second zone back to the first. Only one parking facility entrance from and exit to the vehicle highway need then be provided, and only one lot attendant need be provided, i.e., at the highway exit from the first zone.

The novel features which are considered to be characteristic of the present invention are set forth in particular in the appended claims. The invention itself, however, together with additional objects, features and advantages thereof will be best understood from the following description when read in conjunction with the accompanying drawings in which:

FIG. 1 is a perspective view of the ticket reader and imprinter provided by the present invention;

FIG. 2 is a plan view of a conventional parking ticket which may be used with the reader and imprinter shown in FIG. 1;

FIG. 3 is an elevated view of the ticket reader and imprinter assembly;

FIG. 4 is a sectional view taken along the line 4—4 of FIG. 3; and

FIGS. 5a and 5b together show the ticket reader, print command and gate command electronics provided by the present invention.

Turning first to FIG. 1, a ticket reader and imprinter 10 provided by the present invention is shown as including a hollow vertical stand or pedestal 12 and a housing 14 mounted atop stand 12. Housing 14 has a face plate 16 to which a reader/imprinter mechanism (FIGS. 3–4 is attached, and a cover 18 which may be removed to expose the reader/imprinter mechanism and the control electronics (FIGS. 5a and b) for maintenance or repair, etc. A plastic throat cover 20 is mounted to face plate 16 and has a horizontal slit 22 through which a previously-dispensed ticket may be inserted by a vehicle operator to engage and activate the reader and imprinter mechanism. An illuminated plate 24 indicates that the ticket is to be inserted into slit 22 while a diagram 26 indicates the preferred orientation of the ticket prior to insertion. Preferably, base 12 and face plate 16 are designed such that a vehicle operator sitting in the driver's seat of a conventional automotive passenger vehicle may extend his arm horizontally through a side vehicle window and insert a parking ticket into slot 22.

FIG. 2 shows a conventional parking ticket 30 of the type dispensed by the apparatus disclosed in the above-referenced Nutter et al patent. The ticket includes prepunched holes 32, 34, 36 and 38 by means of which the drive sprocket in the dispenser engages and moves the ticket. Preprinted information indicating the name or location of the parking lot, or the name of the dispenser manufacturer, for example, is often printed on one side of the ticket with parking conditions, parking rates and liability disclaimers, etc. printed on the other. Parking time and date information should be stamped in a blank area 40 so that a lot attendant may easily read the information and determine the parking fee. When a vehicle approaches the main lot entrance at which the ticket dispenser is located, which entrance is also the entrance to a first parking zone, time and data information will be stamped on ticket 30 in a first blank area 42 before the ticket is provided by the dispenser. When the vehicle operator desires to park in second parking zone having a parking rate different from that of the first, he may proceed through the first zone to the entrance to the second at which an imprinter provided by the present invention and shown in FIG. 1 is located, preferably together with a conventional swing-arm vehicle gate. The operator then inserts ticket 30 into the imprinter which stamps appropriate time and date information or indicia related to the second parking zone in a second blank area 44 on the face of the ticket. When the vehicle operator is ready to leave the parking area, he first approaches an exit from zone two into zone one at which an imprinter is located, again preferably associated with a swing-arm vehicle gate, which imprints information in a third blank area 46 within area 40. The operator may then proceed through the first parking zone to the main lot exit at which an attendant determines the parking fee from the information or indicia imprinted with areas 42, 44 and 46. It will be evident that the attendant's function will be greatly facilitated when the indicia of interest is printed in zones 44, 46 as shown rather than on the reverse side of ticket 30, or on separate ticket sides for example. For this reason the preferred insertion orientation is indicated at 26 (FIG. 1) on both of the imprinters associated with the second parking zone.

Turning now to FIGS. 3 and 4, a reader and imprinter assembly 50 which is mounted directly behind face plate 16 (FIG. 1) has a ticket-receiving throat generally indicated at 52 aligned with slot 22. Throat 52 is defined by upper and lower plates 54, 56 which are respectively flared at 58, 60 at the throat entrance, and by left and right side plates 62, 64 respectively beveled at 66, 68 to better guide an incoming ticket into the ticket throat. A timer and stamp assembly 70, which may be a Model 3800 Series AR timer manufactured by Lathem Time Recorder Co. of Atlanta, Georgia for example, is mounted vertically of throat 52 and includes a clock motor 72, date and time indicating wheels 74 geared to clock motor 72, and a stamping solenoid assembly 76 all mounted on a common chassis 78. Solenoid assembly 76 includes an electrical coil 80 mounted within a bracket 82, and a plunger 84 of magnetic material received within solenoid 80 and terminating in a horizontal stamp platen 86 directly below wheels 74. A platen guide pin 88 is fastened to bracket 82 and is received in a guide hole 90 in platen 86. A ribbon 97 is passed between upper bracket 54 and wheels 74. Upper and lower throat plates 54, 56 are respectively gapped at 89, 91 to allow plunger platen 86 to contact the ticket and push the ticket against ribbon 97 and wheels 74 when solenoid 80 is energized, the energized position of platen 86 being indicated in phantom at 86' of FIG. 3.

A limit switch 92 has a switch arm 94 extending through chassis 78 and terminating adjacent the inner terminus 96 of throat 52, i.e., at the throat end remote from face plate 16. When a ticket is fully inserted into throat 52 as shown in phantom at 30' of FIG. 4, switch arm 94 is moved by the ticket to an activated position indicated in phantom at 94' of FIGS. 3 and 4. Switch 92 thus provides an indication that a ticket is in throat 52 and is in a position to be read and stamped. An optical reader 100 is mounted near the entrance of throat 52 and includes a pair of optically emitting devices 102, 104 such as LED's (light emitting diodes) mounted on a bracket 106. A pair of corresponding photosensitive devices 108, 110 such as phototransistors are mounted on a bracket 112 in vertical alignment with LED's 102 and 104 through the upper and lower throat plate holes 114, 116 and 118, 120 respectively. As best seen in FIG. 4, phototransistors 108, 110 (and LED's 102, 104 not shown in FIG.4) are mounted on a line angulated slightly with respect to the main horizontal axis of throat 52. Furthermore, phototransistor 110 and LED 104 are located a predetermined distance axially of switch arm 94 such that, when the ticket is fully inserted into throat 52 as shown in 30' in FIG. 4, phototransistor 110 is optically coupled to LED 104 through a sprocket-drive hole 34' in the ticket. On the other hand, photocoupling between phototransistor 108 and LED 102 is blocked by the margin of ticket 30'. When switch 92 is activated, the ticket is thus "read" by the presence of optical coupling between phototransistor 110 and LED 104, and the absence of optical coupling between phototransistor 108 and LED 102. Reader 100, solenoid 80 and switch 92 are electrically connected to a terminal strip within a protective housing 122 and then via a cable 123 to an electronic chassis 124, the contents of which are next to be described in connection with FIGS. 5a and 5b. Clock motor 72 runs continuously and is to be connected to a suitable power source.

With correspondingly labeled conductors in the respective figures connected, FIGS. 5a and 5b together depict a presently preferred embodiment of the control electronics 130 provided by the present invention, together with time and stamp assembly 70 and optical reader 100 (FIGS. 3 and 4). Referring to FIGS. 5a and b, 117VAC is fed from a terminal 132 through a normally open power switch 134 which is located within base 12 (FIG. 1) and is closed by a lot attendant to turn on the ticket reader/imprinter. From switch 134, 117VAC is fed to one side of a lamp 136 which illuminates plate 24 (FIG. 19, through a fuse 138 to a power supply 140, and to one terminal of a solenoid drive 142 within recorder 70 (but not shown in FIGS. 3 and 4). As indicated above, recorder 70, including driver 142, is preferably purchased as a single unit from Lathem Time Recorder Co. The neutral side of 117VAC is fed from a terminal 144 to lamp 136, power supply 140 and driver 142, and is also connected through clock 72 and a normally closed attendant switch 145 to terminal 132. AC ground is connected from a terminal 146 to signal and chassis ground 148. Switch 145 remains closed during normal operation such that power is continuously supplied to clock motor 72 independently of power switch 134. To operate the reader/imprinter, terminals 132, 144 and 146 must be connected to a suitable source of electric power.

The negative output 150 of power supply 140 is connected to ground 148 while the positive terminal 152 of the power supply is connected through normally open ticket switch 92 (FIGS. 3 and 4), and then through a normally closed swing-arm gate interlock switch 154 to a power bus 156. A swing-arm vehicle gate of the type described above is indicated schematically in FIG. 5a at 155. Interlock 154 is conventionally located in swing-arm gate 155 and is closed when the swing-arm is in a down position. Thus, supply terminal 152 is connected to power bus 156 when ticket switch 92 is closed by entry of a ticket into throat 52 (FIGS. 3 and 4) and when gate 155 is fully down or closed. Supply terminal 152 is also connected to the common terminal 157 of a normally open switch 159. Switch 159 has a normally open terminal 161.

Reader 100 (FIGS. 3 and 4) is shown in FIG. 5a. LED 104 is indicated as being optically coupled to phototransistor 110 while LED 102 is optically blocked from the base of transistor 108. As indicated above with respect to FIGS. 3 and 4, this is a condition which will be present when ticket 30' (FIG. 4) has been fully inserted into throat 52 and is in the correct orientation. As shown in FIG. 5a, output 152 from power supply 140 is connected through a resistor 158 and then through the series anode-cathode connection of three diodes 160, 162 and 164 to ground 148. The junction of resistor 158 and diode 160 is thus three diode drops or about 2.1 VDC above ground and is connected to the anode of LED's 102 and 104. The cathodes of LED's 102 and 104 are connected to ground 148.

The collectors of phototransistors 108 and 110 are connected to power supply terminal 152. The emitter of phototransistor 108 is connected through a resistor 166 to ground 148, and is also connected through a second resistor 168 to the base of an NPN transistor 170 which has its emitter connected to ground. The base of transistor 170 is also connected to ground through a capacitor 172 while the collector thereof is connected through a relay coil K1 to bus 156. An arc suppression diode 176 is connected across coil K1 in the reverse voltage direction to suppress inductive ringing in the coil when transistor 170 turns off. Similarly, the emitter of phototransistor 110 is connected through a resistor 178 to ground 148, and is also connected through a resistor 180 to the base of an NPN transistor 182 which has its emitter connected to ground and its collector connected to bus 156 through a relay coil K2. The base of transistor 182 is connected to ground 148 through a capacitor 186, and an arc suppression diode 188 is connected in the reverse voltage direction across coil K2.

A pair of normally closed contacts K1-A asociated with relay coil K1 and a pair of normally opened contacts K2-A associated with relay coil K2 are connected in series between bus 156 and the common contact 198 of a single pole double throw switch 196 which has a normally open contact 200 connected to bus 156 and a normally closed contact 194 connected through a relay coil K3 to ground 148. An arc suppression diode 204 is connected across coil K3. Thus, with LED 104 optically coupled to phototransistor 110, phototransistor 110 conducts placing a positive voltage at the base of transistor 182. Transistor 182 is thereby turned on, energizing relay coil K2 and closing normally opened contacts K2-A. Light from LED 102 is blocked, however, from phototransistor 108 so that transistors 108 and 170 remain nonconductive, relay coil K1 remains deenergized, and normally closed contacts K1-A remain closed. Thus, with switch 196 in the normal position, i.e., common contact 198 connected to normally closed contact 194, bus 156 is connected through contact sets K1-A and K2-A, through switch 196 and through relay coil K3 to ground. Coil K3 is thus energized indicating that a ticket has been "read."

Should a malfunction occur in reader 100 or in the sensing circuitry comprising transistors 170 and 182, a lot attendant may activate switch 196 such that common terminal 198 is connected to normally open terminal 200. Bus 156 is then connected directly to coil K3 so that coil K3 will be energized whenever voltage is applied to bus 156 through switches 92 and 154. Thus, mere insertion of a ticket into ticket throat 52, regardless of ticket orientation, will activate control coil K3 via closure of switch 92. Coil K3 may also be energized directly from power supply terminal 152, i.e., short circuiting switches 92, 196 and 155, by closure of switch 159. This may be accomplished, for example, by a lot attendant should ticket throat 52 become clogged or jammed such that a ticket may not be inserted therein.

A set of normally open relay contacts K3-A is associated with relay coil K3 and is connected through terminals 208, 210 to gate 155. Activation of coil K3 followed by closure of contacts K3-A thus provides a gate-vend signal to gate 155 and signals the gate to raise its associate arm. A set of normally open relay contacts K3-B associated with relay coil K3 connects a common terminal 212 of solenoid driver 142 to a time stamp activating input terminal 214. Similarly, a set of normally closed relay contacts K3-C connects terminal 212 to a time stamp deactivating input terminal 216. Contact sets K3-B and K3-C thus provide an information transfer or stamp signal to driver 142 when coil K3 is energized. This signal energizes stamping solenoid 80 and a ribbon advance solenoid 224 to advance ribbon 97 (FIG. 4). The noise suppression capacitors 220, 222 are respectively connected across contact sets K3-B and K3-C.

To summarize the operation of control electronics 130, a parking ticket is inserted by a vehicle operator into throat 52 (FIGS. 3 and 4) such that switch 92 is closed, and correct ticket orientation is sensed by reader 100. Relay coil K2 is energized while coil K1 remains deenergized. Power is supplied to relay coil K3 through contact sets K1-A, K2-A and through switch 196. A vend signal is provided to gate 155 by contact set K3-A, while contact sets K3-B and K3-C signal driver 142 to stamp the ticket inserted in the ticket throat with time and date indicia from wheels 74 (FIG. 3). The vehicle operator may then withdraw his ticket from the reader/imprinter and drive through the gate. Optionally, control relay K3 may be activated by mere insertion of a ticket into the ticket throat regardless of orientation via switches 92 and 196, or independently of ticket insertion via switch 154.

From the foregoing description it will now be apparent that there has been provided in accordance with the present invention a ticket reader and imprinter for use with the same which fully satisfy all of the objects, features and advantages set forth above. While the invention has been described in conjunction with a specific, presently preferred embodiment thereof, numerous alternatives, modifications and variations will suggest themselves to persons skilled in the art in view of the foregoing description. Accordingly, the present invention is intended to embrace all such alternatives, modifications and variations as fall within the spirit and broad scope of the appended claims.

The invention claimed is:

1. A ticket reader and imprinter for use with a ticket having at least one hole prepunched therein comprising a ticket throat having an entrance to receive said ticket, means positioned adjacent said throat to transfer information onto a ticket disposed in said throat upon receipt of a transfer signal, means to sense insertion of a ticket through said entrance and into said throat in a predetemined orientation, means responsive to said sensing means to supply a transfer signal, and switch means selectively responsive to insertion of a ticket into said throat to supply a transfer signal independently of orientation of the ticket in said throat.

2. The ticket reader and imprinter set forth in claim 1 wherein said switch means comprises a first switch disposed adjacent said throat remotely of said throat entrance and activated by a ticket fully inserted into said throat, and a second switch selectively short circuiting said sensing means such that a transfer signal is provided whenever said first switch is activated.

3. The ticket reader and imprinter set forth in claim 2 wherein said first switch comprises a limit switch having an actuator arm disposed at an end of said throat remote from said throat entrance and limiting insertion of a ticket into said throat, such that said ticket is held in fixed position relative to said sensing means by said actuator arm.

* * * * *